Patented May 5, 1953

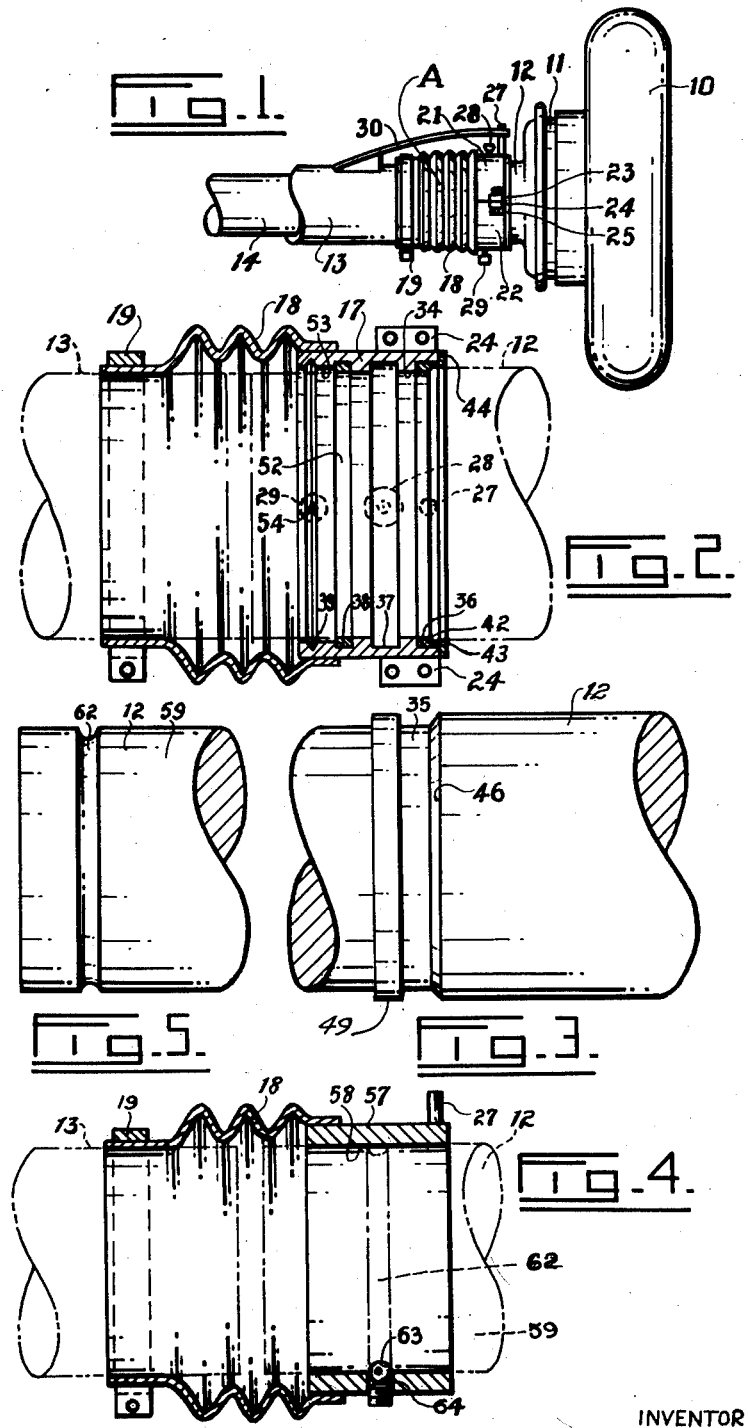

2,637,573

UNITED STATES PATENT OFFICE 2,637,573

BEARING SEALING ASSEMBLY

Arthur L. Cochrane, Powell River,
British Columbia, Canada

Application June 27, 1949, Serial No. 101,647

5 Claims. (Cl. 286—11)

This invention relates to bearing sealing assemblies.

The main purpose of this invention is providing a sealing assembly for keeping dirt and moisture out of and keeping oil and grease in bearings of rotating parts at the point where they come against stationary parts. The invention is particularly adapted for wheels and it is intended to protect the bearings thereof from foreign materials and moisture.

As this invention is particularly useful for the wheels of vehicles, such as automobiles, buses, trucks and the like, it is described herein in connection with a wheel. The sealing assembly is used in association with a hub of the wheel. The assembly includes a bearing sleeve which rotatably fits on a hub. The outer end of this sleeve is connected by a dust- and moisture-proof bellows to a ring mounted on a non-rotating part, such as an axle or axle housing. Suitable means is provided for preventing the sleeve from rotating with the wheel hub. The outer surface of the hub and the inner surface of the bearing sleeve are machined so that they form an almost perfect fit. In addition to this, the sleeve may be provided with internal grooves containing sealing rings. If it is desired, the sleeve may be provided with oiling means, and with means for trapping oil to prevent it from escaping therefrom.

An example of this invention is illustrated in the accompanying drawings, in which, Figure 1 diagrammatically illustrates the bearing sealing assembly in use on a vehicle wheel, Figure 2 is an enlarged longitudinal section through the assembly, Figure 3 is an elevation of the wheel hub for the bearing of Figure 1, Figure 4 is a section through an alternative assembly, and Figure 5 is an elevation of the wheel hub for the bearing of Figure 4.

Referring to the drawings, 10 is the outline of a vehicle wheel having a brake drum 11 with a hub 12 projecting inwardly therefrom, said drum and hub rotating with the wheel. In this example, part of the bearing assembly is mounted on the housing 13 of a floating axle 14.

The bearing sealing assembly generally indicated at A consists of a bearing sleeve 17 which is connected by a dust-proof and moisture-proof bellows 18 to a non-rotating part, such as the housing 13, by a clamping ring 19, see Figure 1.

The bearing sleeve 17 is preferably formed in two almost identical co-operating sections 21 and 22. The sections 21 and 22 are provided at diametrically opposite sides thereof with lugs 23 and 24 which are secured together by bolts 25. A pin 27 projects upwardly from the section 21. An oil cup 28 is provided at the top of the bearing sleeve, while an oil receptacle 29 is provided at the bottom thereof. The bearing sleeve is prevented from rotating by means of an arm 30 which is fixed to the axle housing 13 and extends over the sealing assembly to engage the pin 27.

The inner surface 34 of the bearing sleeve is accurately machined to fit snugly, but rotatably on a correspondingly machined outer surface 35 on the hub 12. These surfaces fit so closely that it is practically impossible for any foreign material or moisture to pass therebetween. Spaced grooves 36, 37, 38 and 39 are formed in the inner surface 34. The groove 36 opens out at the outer end of the bearing sleeve and it contains a sealing ring 42 which has an inwardly bevelled surface 43 at its outer end. This sealing ring is held in place by an annular ring 44 which is secured to the end of the bearing sleeve and overlaps the sealing ring. The bevel surface of this ring bears against a bevel surface or shoulder 46 formed on the hub 12. Actually, the diameter of the hub at the machined surface 35 is less than that on the opposite side of the bevel surface 46.

The groove 37 is substantially midway between the opposite ends of the bearing sleeve and it is accurately machined to fit over a machined shoulder 49 formed on the hub. The fit between this shoulder and the groove is such that there is practically no axial displacement between the hub and the bearing sleeve. The oil cup 28 opens into the groove 37, as indicated by broken lines in Figure 2.

Another sealing ring 52 is carried by the groove 38 which is spaced inwardly from the outer end of the bearing sleeve. The inner diameter of the sleeve at 53 is greater than that of the machined surface 34, so that the surface 53 is actually spaced from the surface of the hub. The oil receptacle 29 opens into the bottom of the groove 39 at 54.

With the various parts arranged as described, the bearing sleeve 17 is actually floating on the hub or other part on which it is mounted. The only place that there is any possibility of dust or moisture getting into the assembly would be between the inner end of the bearing sleeve 17 and the hub 12. However, at this point the foreign material encounters a sealing ring, which is formed of a suitable material, such as felt or nylon. Furthermore, centrifugal action tends to throw out material from between the bevels 43 and 46 of the sealing ring and the hub respectively. The area between this ring and the sealing ring 52 is effectively lubricated by oil from the cup 28. The two halves of the bearing sleeve are fitted around the hub and the shoulder 49 fits into the internal groove 37 to retain the sleeve in position. It is obvious that it is practically impossible for any foreign material to get past the sealing rings and the shoulder 49, and between the machined inner surface of the sleeve and the outer surface of the hub. Any oil that might get past the ring 52 is trapped in the groove 39, from which it drains into the receptacle 29, and the bellows 18 close the outer end of the sealing ring. The shoulder 49 prevents the bearing sleeve from moving longitudinally of the hub.

An alternative form of this invention is illustrated in Figures 4 and 5. In this case, a bearing sleeve 57 is used in place of the sleeve 17 described above and has an inner surface 58 which is machined exactly to fit a correspondingly machined surface 59 on the hub 12. A groove 62 is formed in the outer surface of this hub. A ball 63 is located in a threaded radial passage 64 formed in the sleeve 57 and is adapted to extend into the groove 62 of the hub when the sleeve is mounted on the latter. This sleeve may also have a pin 27 projecting upwardly therefrom which is engaged by the arm 30 which prevents the sleeve from rotating with the hub.

The inner surface 58 of the bearing sleeve 57 is so accurately machined to fit on the hub 12 that it is practically impossible for moisture or any foreign material to pass therebetween. The bellows 18 and its clamping ring 19 keep dirt away from the outer end of the ring. This bearing sleeve is preferably formed from a self-lubricating metal so that no additional lubrication is required. As the ball 63 rides in the groove 62, the bearing sleeve cannot move longitudinally of the hub.

What I claim as my invention is:

1. A bearing sealing assembly for a rotatable hub where it comes against a stationary part, comprising a bearing sleeve rotatably mounted on a hub, said sleeve being formed in two half sections removably secured together, a bellows extending from an end of the sleeve to a stationary part, means connecting the free end of the bellows to the stationary part to seal said end, means for preventing the sleeve from rotating with the hub, a groove formed in the inner surface of the sleeve substantially midway between the ends thereof, and a concentric shoulder formed on the hub and fitting into said groove.

2. A bearing sealing assembly for a rotatable hub in axial alignment with a stationary housing, comprising a bearing sleeve rotatably mounted on the hub, said sleeve being formed in two half sections removably secured together, the inner surface of the sleeve being machined to fit snugly on a correspondingly machined outer surface on the hub, a bellows secured to the end of the sleeve nearest the housing and extending over the latter, a clamp connecting the free end of the bellows to the housing to seal said end, means extending from the housing outside the bellows for preventing the sleeve from rotating with the hub, and a groove accurately machined in the inner surface of the sleeve spaced from the opposite ends thereof fitting over a machined shoulder formed on the hub for restraining the sleeve from longitudinal movement on the hub.

3. A bearing sealing assembly for a rotatable hub where it comes against a stationary part, comprising a bearing sleeve rotatably mounted on a hub, said sleeve being formed in two half sections removably secured together, a bellows extending from an end of the sleeve to a stationary part, means connecting the free end of the bellows to the stationary part to seal said end, means for preventing the sleeve from rotating with the hub, a plurality of grooves formed in the inner surface of the sleeve, a concentric shoulder formed on the hub and fitting into a groove substantially midway between the ends of the sleeve, and sealing rings in grooves on opposite sides of the shoulder.

4. A bearing sealing assembly as claimed in claim 3 including means for supplying a lubricant to the sleeve groove in which the shoulder fits, and means for removing liquid from a groove between the shoulder and the outer end of the hub within the sleeve.

5. A bearing sealing assembly for a rotatable hub where it comes against a stationary part, comprising a bearing sleeve rotatably mounted on a hub, said sleeve being formed in two half sections removably secured together, a bellows extending from an end of the sleeve to a stationary part, means connecting the free end of the bellows to the stationary part to seal said end, said hub having a bevelled shoulder formed thereon adjacent the outer end of the sleeve remote from the stationary part, a plurality of grooves formed in the inner surface of the sleeve, one of said grooves opening out at the outer end of the sleeve, a sealing ring in the last-mentioned groove having an inwardly bevelled surface at its outer end bearing against the bevelled shoulder of the hub, a shoulder formed on the hub and fitting into the next groove in from the outer end of the sleeve, means for supplying of lubricant to the groove having the shoulder therein, a sealing ring in the next groove inwardly of the latter groove, and means for removing liquid from the groove inwardly of the latter sealing ring.

ARTHUR L. COCHRANE.

References Cited in the file of this patent

UNITED STATES PATENTS

| Number | Name | Date |
| --- | --- | --- |
| 1,772,093 | Wilson | Aug. 5, 1930 |
| 1,787,459 | Tawresey | Jan. 6, 1931 |
| 1,840,127 | Penney | Jan. 5, 1932 |
| 2,005,587 | Lorig | June 18, 1935 |
| 2,023,898 | Olson | Dec. 10, 1935 |

FOREIGN PATENTS

| Number | Country | Date |
| --- | --- | --- |
| 10,626 | Australia | Dec. 30, 1932 |
| 209,265 | Great Britain | of 1924 |